Patented Oct. 29, 1929

1,733,218

UNITED STATES PATENT OFFICE

LUCIEN DUPONT, OF VINCENNES, FRANCE

MANUFACTURE OF SYNTHETIC CAMPHOR

No Drawing. Application filed June 5, 1926, Serial No. 114,031, and in France June 12, 1925.

This invention relates to the manufacture of synthetic camphor by use of a liquid catalyst which has been the object of a previous United States Patent No. 1,641,579, dated September 6, 1927. In this patent the use as catalyst of chlorinated carbides, and among them, tetrachlorethane, trichlorethylene, carbon tetrachloride, chloroform, etc., have been more particularly mentioned. It has also been stated that the effect of these catalysts is more rapid than that of other liquids such as crystallizable benzene which are inferior catalysts. It has equally been mentioned that the products of reaction resulting from the use of tetrachlorethane and trichlorethylene are substantially free of oily components and almost exclusively composed of bornyl oxalate.

Although the catalytic reactions produced with hydrocarbons such as crystallizable benzene, toluene and other hydrocarbons of the same series show the disadvantages already mentioned: less rapid reactions and, production of a borneol having a lesser degree of purity, it is nevertheless to be considered that the absence of chlorine in these hydrocarbons is positively advantageous. The production of acid not being possible the isomerization into dipentene of part of the turpentine used, promoted even by a trace of said acid is prevented, hence the output reckoning on the turpentine put in use is superior. Lastly the absence of hydrochloric acid is also advantageous as regards the apparatus.

It has now been found that the defects of these hydrocarbons may be amended by increasing their relative proportion in the mixture of components put in use. This new mode of operation forms the object of my present invention. The greater the proportion of these hydrocarbons in the mixture, the more rapid the reaction will be and the greater also the quantity of turpentine in reaction. By increasing the proportion of these hydrocarbon catalysts it becomes possible to bring in almost the whole quantity of turpentine in use, in combination with oxalic acid and this is of great advantage. It will be evident that hydrocarbon mixtures may be substituted as catalysts for a single homogeneous hydrocarbon. The use of such a mixture may be preferable in order to maintain the temperature of reaction unvaried.

An example is given below of this improved process:

*Example.*—A mixture of 1 part dry oxalic acid, 3 to 4 parts rectified turpentine and 8 parts of the mixture toluene-benzene is heated to a temperature of 110° C. during 6 to 8 hours It is evident that the increased quantity of catalyst gives good results with chlorinated catalysts. The proportion of 2 parts of the catalyst for 1 part of turpentine is very appropriate.

The process described in the patent above cited remains the same but the output is considerably better and may be more than 70% of the turpentine employed, the oxalic acid which has not entered in the combination is wholly recovered.

What I claim and desire to secure by Letters Patent of the United States is:—

1. In the process of making camphor from turpentine by converting pinene into bornylester, saponifying the ester to borneol and oxidizing the borneol to camphor; the improvement which comprises acting on turpentine with oxalic acid and a mixture of benzene and toluene that is double the quantity of turpentine used and at a temperature that is substantially the boiling point of the mixture.

2. In the process of making camphor from turpentine by converting pinene into bornylester, saponifying the ester to produce borneol and oxidizing the borneol to camphor; the improvement which comprises acting on three to four parts of turpentine with one part of dry oxalic acid and eight parts of a mixture of benzene and toluene, said mixture acting as a catalyst, and heating the mixed products to a temperature of about 110° C. during six to eight hours.

In testimony that I claim the foregoing as my invention, I have signed my name.

LUCIEN DUPONT.